United States Patent
Mansour et al.

(10) Patent No.: US 9,247,139 B2
(45) Date of Patent: Jan. 26, 2016

(54) METHOD FOR VIDEO BACKGROUND SUBTRACTION USING FACTORIZED MATRIX COMPLETION

(71) Applicant: Mitsubishi Electric Research Laboratories, Inc., Cambridge, MA (US)

(72) Inventors: Hassan Mansour, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 87 days.

(21) Appl. No.: 14/078,804

(22) Filed: Nov. 13, 2013

(65) Prior Publication Data

US 2015/0130953 A1 May 14, 2015

(51) Int. Cl.
*H04N 5/232* (2006.01)
*G06T 7/20* (2006.01)

(52) U.S. Cl.
CPC .............. *H04N 5/23267* (2013.01); *G06T 7/20* (2013.01)

(58) Field of Classification Search
CPC ... H04N 5/2355; H04N 5/2356; H04N 5/243; H04N 19/00787; H04N 19/00751; G06T 9/004; G06T 2207/20144; G06T 2207/10016
See application file for complete search history.

(56) References Cited

U.S. PATENT DOCUMENTS

2011/0254950 A1* 10/2011 Bibby et al. .................. 348/135
2013/0120600 A1* 5/2013 Jin et al. ...................... 348/208.4

OTHER PUBLICATIONS

J. Wright, A. Ganesh, S. Rao, and Y. Ma, "Robust principal component analysis: Exact recovery of corrupted low-rank matrices via convex optimization," in Advances in Neural Information Processing Systems 22, 2009.

E. J. Cand'es, X. Li, Y. Ma, and J. Wright, "Robust principal component analysis?," J. ACM, vol. 58, No. 3, pp. 11:1-11:37, Jun. 2011.

J. He, L. Balzano, and J. C. S. Lui, "Online robust subspace tracking from partial information," Cornell University Librry, 1109.3827, 2011.

J. He, D. Zhang, L. Balzano, and T. Tao, "Iterative grassmannian optimization for robust image alignment," Cornell University Library, 1306.0404, 2013.

A.Y. Aravkin, R. Kumar, H. Mansour, B. Recht, and F.J. Herrmann, "A robust svd free approach to matrix completion, with applications to interpolation of large scale data," Cornell University Library, 1302.4886, 2013, May 1, 2013.

* cited by examiner

*Primary Examiner* — Mekonnen Dagnew

(74) *Attorney, Agent, or Firm* — Dirk Brinkman; Gene Vinokur

(57) ABSTRACT

A method processes a video acquired of a scene by first aligning a group of video images using compressed domain motion information and then solving for a low rank component and a sparse component of the video. A homography map is computed from the motion information to determine image alignment parameters. The video images are then warped using the homography map to share a similar camera perspective. A Newton root step is followed to traverse separately Pareto curves of each low rank component and sparse component. The solving for the low rank component and the sparse component is repeated alternately until a termination condition is reached. Then, the low ranks component and the sparse component are outputted. The low rank component represents a background in the video, and the sparse component represents moving objects in the video.

7 Claims, 4 Drawing Sheets

1: Input $b = \mathcal{A}(X_0 + S_0)$, tolerance $\sigma$
2: Output $L, R, S$
3: Initialize $S = 0$, $L, R$ random Gaussian entries, $\tau_S = \|S\|_1$, $\tau_X = \frac{1}{2}(\|L\|_F^2 + \|R\|_F^2)$
4: while $\|b - \mathcal{A}(X + S)\|_F \leq \sigma$ do
5:    Solve for low rank component:
6:    $b_{LR} = b - \mathcal{A}(S)$
7:    $M = b_{LR} - \mathcal{A}(LR^T)$
8:    $\tau_X = \tau_X + (\|M\|_F - \sigma)/\|\mathcal{A}^T(M)\|_2$
9:    $$\min_{L,R} \|b_{LR} - \mathcal{A}(LR^T)\|_F \text{ s.t. } \|L\|_F^2 + \|R\|_F^2 \leq 2\tau_X \quad (3)$$
10:   Solve for sparse component:
11:   $b_S = b - \mathcal{A}(LR^T)$
12:   $M = b_S - \mathcal{A}(S)$
13:   $\tau_S = \tau_S + (\|M\|_F^2 - \sigma\|M\|_F)/\|\mathcal{A}^T(M)\|_\infty$
14:   $$\min_S \|b_S - \mathcal{A}(S)\|_F \text{ s.t. } \|S\|_1 \leq \tau_S \quad (4)$$
15: end while

*FIG. 2*

METHOD FOR VIDEO BACKGROUND SUBTRACTION USING FACTORIZED MATRIX COMPLETION

FIELD OF THE INVENTION

This invention relates generally to processing videos, and more particularly to subtracting backgrounds in the videos to determine moving foreground objects.

BACKGROUND OF THE INVENTION

Background subtraction segments moving objects from the background in a video acquired of a scene. The segmentation of moving objects can be used to determine trajectories of the objects, and to improve object detection and classification.

Background subtraction can be done by statistical motion flow analysis or an algebraic decomposition. Statistical motion flow methods generally utilize Gaussian mixture models (GMM) of image plane motion to determine the motion of the objects.

Algebraic (QR) decompositions model the background scene as a low dimensional subspace. The moving objects are then segmented as error terms in an orthogonal complement of the background space. When the camera is stationary, the dimensional subspace is low rank and methods, such as robust principle component analysis (RPCA), can successfully segment the foreground from the background. When the camera is moving, the low rank structure no longer holds, and adaptive subspace estimation techniques are used to track the background subspace.

SUMMARY OF THE INVENTION

The embodiments of the invention provide a method for processing a video, i.e., a sequence of images. The method uses an an algebraic decomposition for solving a background subtraction problem with a factorized robust matrix completion (FRMC) procedure with global motion compensation. The method decomposes a sequence of images (group of pictures (GOP)) in the video into a sum of a low rank component, and a sparse motion component. The low rank component represents the background in the video, and the sparse component represents moving objects in the video. The method alternates between a solution of each component following a Pareto curve for each subproblem.

For videos with a moving background, motion vectors are extracted from the video. If the video is encoded, the motion vectors are extracted from a bitstream. The motion vectors compensate for a change in the camera perspective.

The FRMC has a pre-specified rank to determine the low rank component. A block coordinate descent is applied, using spectral projected gradient steps, to alternate between the solutions of the low rank component and the sparse component while traversing an updated Pareto curve of each subproblem.

For video acquired of the scene with a moving camera, we first extract the motion vectors from an encoded video bitstream and fit a global motion in every image to a parametric perspective model with eight parameters. Then, we align the images to match a perspective of the first image in the GOP, and the FRMC to fill in the background pixels that are missing from the individual images in the GOP.

The method can be performed by a processor in batch mode or real-time, and does not require any training step to learn the initial subspace.

BRIEF DESCRIPTION OF THE DRAWINGS

FIG. 2 is a block diagram of pseudocode of the method of FIG. 1;

DETAILED DESCRIPTION OF THE PREFERRED EMBODIMENTS

Figure 1:
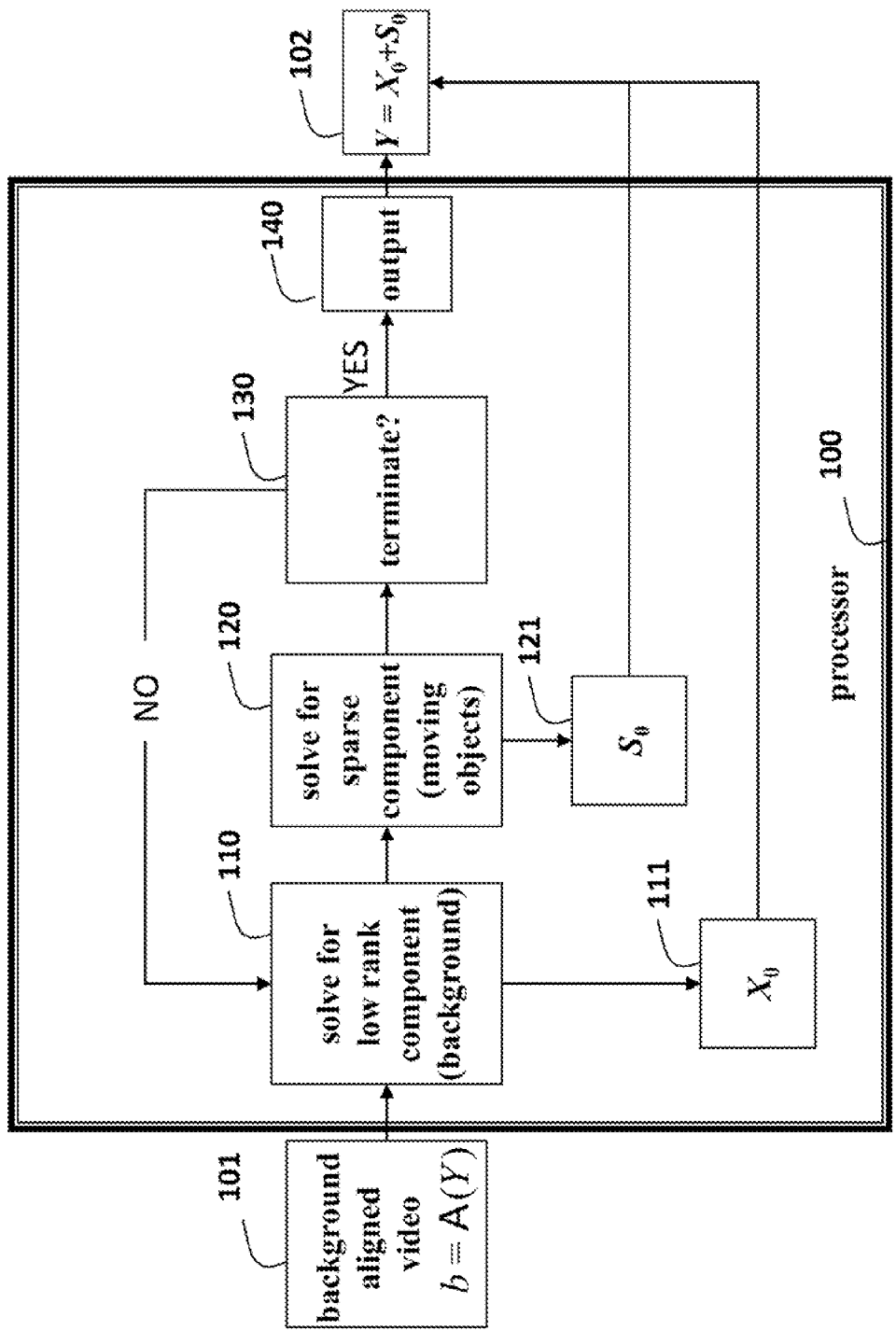
FIG. 1 is a flow diagram of a method for processing a video according to embodiments of the invention.

As shown in FIG. 1, the embodiments of the invention provide a method for decomposing a video 101, i.e., a sequence of images Y, into a background components $X_0$ 111, and moving objects $S_0$ 121. The background is generally assumed to be static, unless the scene is acquired by a moving camera. The moving objects are generally considered part of the "foreground." The method alternates between solving 110 for the background component and solving 120 for the moving objects until a termination condition is detected 130, in which case the background component and moving objects are output 140. The steps of the method can be performed in a processor 100 connected to memory and input/output interfaces by buses as known in the art.

Factorized Robust Matrix Completion

First, we describe our factorized robust matrix completion (FRMC) used to solve the background subtraction problem.

A matrix $Y \in \mathbb{R}^{m \times n}$, i.e., the video 101, is decomposed into a sum of the low rank component $X_0$ 111 and the sparse component $S_0$ 121, such that, $Y = X_0 + S_0$. A restriction operator $A: \mathbb{R}^{m \times n} \to \mathbb{R}^p$ selects a subset $\Omega$ of size p of mn samples, generally pixels, in the matrix Y.

Herein, we defined the FRMC problem as the problem of determining $X_0$ and $S_0$ from incomplete samples $b = A(Y)$. This problem can be formulated as a multi objective minimization problem $$\min_{X,S} \|X\|_* + \lambda \|S\|_1 \text{ subject to } b = A(X + S), \quad (1)$$

where $\lambda$ is a positive weighting parameter, and * indicates the nuclear norm of the matrix X, which is equal to the sum of the singular values of X. When the entries of the matrix Y are fully observed, i.e., A is an identity matrix, the problem is known as robust principal component analysis (RPCA), and the optimization problem (1) is referred to as principal component pursuit (PCP).

The choice of $\lambda = \hat{n}^{-1/2}$, $\hat{n} := \max\{m, n\}$, guarantees the recovery of $X_0$ and $S_0$ with high probability when the rank $(X_0) \leq C \hat{n} (\log \hat{n})^{-2}$ for some constant C that depends on a coherence of the subspace of $X_n$. Solving the problem in equation (1) requires the determination of full (or partial) singular value decompositions of X, i.e., $UDV^T$ in every iteration where U and V are the row and column contain the row and column singular vectors and D is a diagonal matrix containing the singular values, which could become prohibitively complex when the dimensions are large.

To overcome this problem, we use a proxy for the nuclear norm of a rank-r matrix X defined by the following factorization $$\|X\|* = \inf_{L\in R^{m,r}, R\in R^{n,r}} \frac{1}{2}(\|L\|_F^2 + \|R\|_F^2) \text{ such that (s.t)} LR^T = X, \quad (2)$$

where inf represents an infimum function, and T is a transpose operator.

The nuclear norm proxy has been used for conventional standard nuclear norm minimization procedures that scale to very large matrix completion problems. Moreover, if the factors L and R of X have a rank greater than or equal to the true rank of X, then a spectral projected gradient procedure using the nuclear norm proxy is guaranteed to converge to the solution of the corresponding nuclear norm minimization problem.

Our FRMC based method extends the procedure described by Aravkin et al., "A robust SVD approach to matrix completion, with applications to interpolation of large scale data," Cornell University Library, 1302.4886, 2013, May 1, 2013. We solve our FRMC by alternating between the solutions of two subproblems as shown in FIG. 1, and the pseudocode in FIG. 2. All variables used by the pseudocode are described in detail herein.

Each subproblem in the FRMC method is a least absolute shrinkage and selection operator (LASSO) problem that we solve using spectral projected gradient iterations. The rationale behind this approach follows the technique for solving the basis pursuit denoise problem.

For every fixed sparse component S with $b_{LR} = b - A(S)$, the sequence of iterates $X_\tau = LR^T$, where (L, R) is the solution to $$\min_{L,R} \|b_{LR} - A(LR^T)\|_F \text{ s.t.} \|L\|_F^2 + \|R\|_F^2 \leq 2\tau_X, \quad (3),$$

which are samples on the Pareto curve of the nuclear norm minimization problem $$\min_X \|X\|* \text{ s.t.} \|b_{LR} - A(X)\|_F \leq \sigma.$$

The update rule of $\tau_X$ is a Newton root determining step of the problem $\phi(\tau_X) = \sigma$, where $$\phi(\tau_X) = \min_{L,R} \|b_{LR} - A(LR^T)\|_F \text{ s.t.} \frac{1}{2}(\|L\|_F^2 + \|R\|_F^2) \leq \tau_X.$$

In updating $\tau_X$, we first determine the current residual vector $M = b_{LR} - A(LR^T)$ and apply the rule specified in step 8 of FIG. 2. Consequently, the FRMC method alternates between traversing the Pareto curve of the nuclear norm minimization problem and the one-norm minimization problem. For every subproblem, the Pareto curve is updated to the new value of S, and the function $\phi(\tau_X)$ is minimized by following a Newton step on the updated Pareto curve. The same analysis applies to S when L and R are fixed. Therefore, the method guarantees that the error tolerance or termination condition $\|b - A(X+S)\|_F \leq \sigma$ is satisfied.

Global Motion Parametrization

In videos acquired by a moving camera, applying the FRMC method directly to the video images fails in segmenting the correct motion because the background is non-stationary. A non-stationary background is not in a low rank subspace. Therefore, we can only expect the method to fail. Hence, we first estimate the global motion parameters in the video to compensate for the camera motion. Then, we align the background and apply the FRMC method to segment the moving objects.

One approach for global motion estimation relates the coordinates $(x_1, y_1)$ in a reference image $I_1$ to the coordinates $(x_2, y_2)$ in a target image $I_2$ using an 8-parameter homography vector h such that $$x_2 = \frac{h_0 + h_2 x_1 + h_3 y_1}{1 + h_6 x_1 + h_7 y_1} \text{ and} \quad (5)$$

$$y_2 = \frac{h_1 + h_4 x_1 + h_5 y_1}{1 + h_6 x_1 + h_7 y_1}.$$

Given a homography vector $h = [h_0\ h_1\ h_2\ h_3\ h_4\ h_5\ h_6\ h_7]^T$ that relates the two images, we can warp the perspective of image $I_2$ to match the perspective of image $I_1$, thereby aligning the backgrounds of both images. However, estimating h from the raw pixel domain requires determining point-to-point matches between a subset of the pixels of the two images.

To determine h, we use the horizontal and vertical motion vectors $(m_x, m_y)$ that are available from the encoded video bitstream or during an encoding process. Here, we assume that motion estimation is performed using the previous video image as the reference image. The motion vectors provide relatively accurate point matches between the two images. Note, however, that we are only interested in matching pixels from the moving background. Therefore, we first determine a 32 bin histogram of each of the motion vectors $m_x$ and $m_y$. Next, we extract a subset $\Lambda$ of the indices of pixels whose motion vectors are shared by at least 20% of the pixels in the image. Our assumption here is that foreground objects correspond to less than 20% of the moving pixels in the image. This threshold can vary between different scenes and video sequences. We then use the motion vectors indexed by $\Lambda$ to estimate the homography parameter vector h by solving the following least squares problem:

$$h = \underset{\tilde{h}}{\operatorname{argmin}} \|p_\Lambda - E\tilde{h}\|_2, \quad (6)$$

where the function min return the minimum, and $$p_\Lambda = \begin{bmatrix} x_{2\Lambda} \\ y_{2\Lambda} \end{bmatrix}, x_{2\Lambda} = x_{1\Lambda} + m_{x\Lambda}, y_{2\Lambda} = y_{1\Lambda} + m_{x\Lambda},$$

and the matrix $$E = \begin{bmatrix} 1 & 0 & x_{1\Lambda} & y_{1\Lambda} & 0 & 0 & -x_{2\Lambda}x_{1\Lambda} & -x_{2\Lambda}y_{1\Lambda} \\ 0 & 1 & 0 & 0 & x_{1\Lambda} & y_{1\Lambda} & -y_{2\Lambda}x_{1\Lambda} & -y_{2\Lambda}y_{1\Lambda} \end{bmatrix},$$

were the subscript $\Lambda$ indicates a restriction of the indices to the set $\Lambda$.

Figures 3A, 3B:
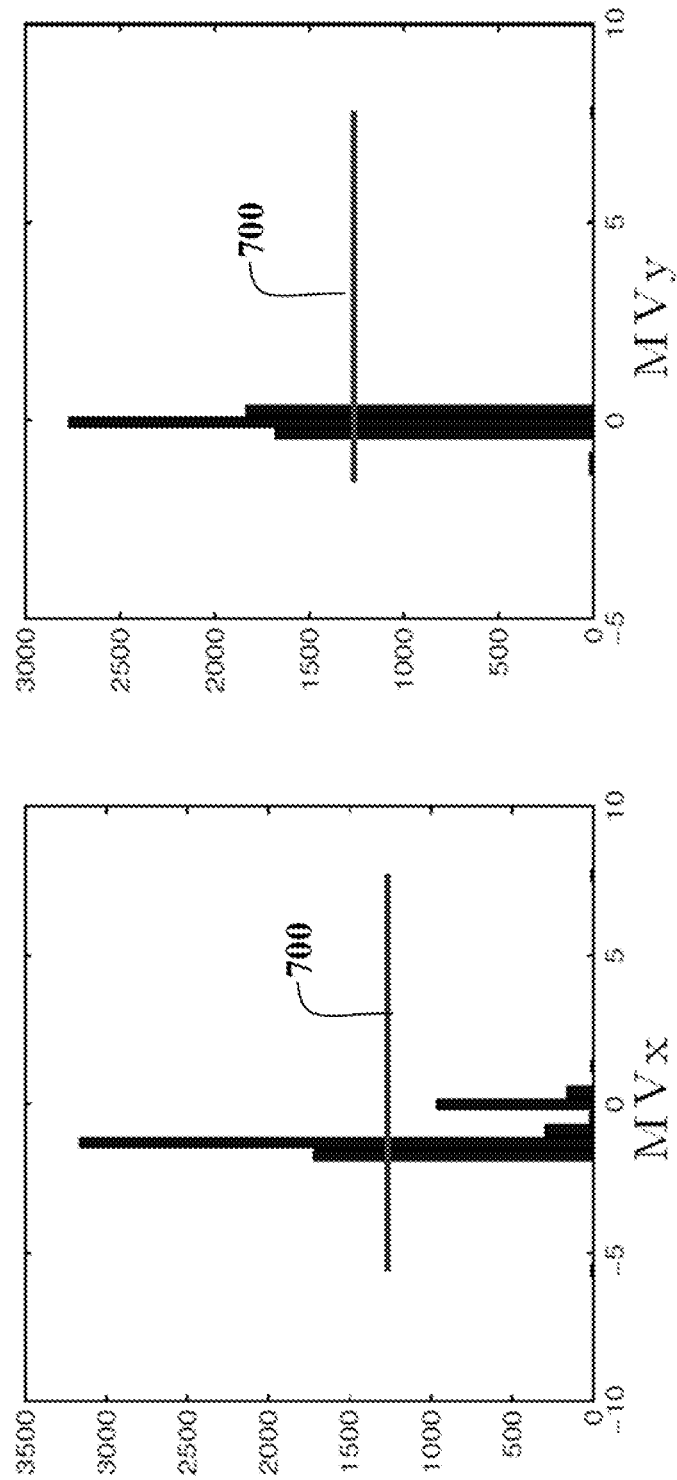
FIGS. 3A and 3B are histograms of horizontal and vertical motion vectors for an example video acquired by a moving camera.

FIGS. 3A and 3B show histograms and cutoff thresholds of the vertical and horizontal motion vectors from an example image. The spike at zero in the Mvx histogram that falls under the 20% threshold. This spike corresponds to an object in the image sequence that appears stationary relative to the camera perspective when in fact it is in motion. This approach correctly determines the motion of the background and fits the homography parameters to the background pixels alone.

Figure 4:
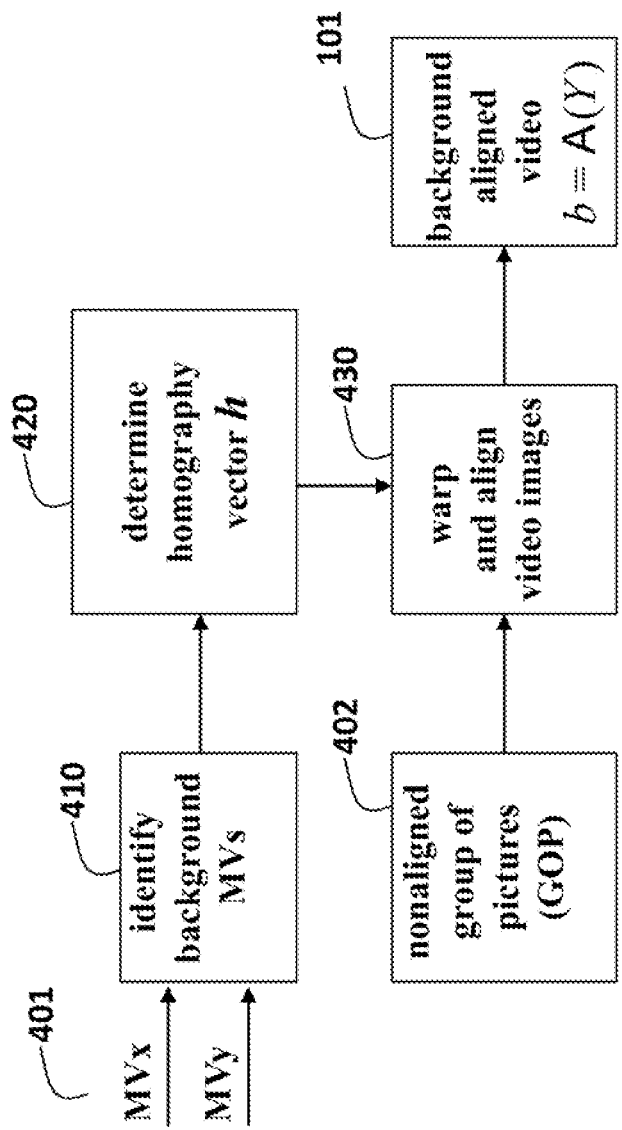
FIG. 4 is a flow diagram aligning and warping images according to embodiments of the invention.

We align the nonaligned GOP 402 following the steps in FIG. 4 relative to the perspective of the first image in the GOP by sequentially warping the images using the coordinates MVx and MVy 401 of the previously warped image $\hat{I}_1$ as reference to warp the coordinates of the next image $I_2$ by applying equation (5). We do this by identifying 410 motion vectors (MVs) in the background, and determining 420 the homography vector h. Then, we warp and align 430 the video images to obtain the background aligned video images 101.

Due to the camera motion, the warped images $\hat{I}_2$ generally occupy a larger viewing area relative to the reference image $I_2$. Consequently, applying a forward map $f:(x_1, y_1) \to (\hat{x}_2, \hat{y}_2)$ often results in holes in the warped image. To correct this problem, we determine the reverse mapping $g:(\hat{x}_2, \hat{y}_2) \to (x_2, y_2)$ as a function of h and warp the image to obtain $\hat{I}_2(\hat{x}_2, \hat{y}_2) = I_2(g(\hat{x}_2, \hat{y}_2))$.

Background Subtraction Via FRMC

After the images are warped and aligned using global motion compensation, we vectorize the images and stack the vectors into the matrix Y of size m×n, where m is the number of pixels in each GOP image and n is the number of images in the GOP. The warped images can contain large areas where there are no intensity measurements. Therefore, we construct the restriction operator A that identifies the pixels that contain intensity values. Applying the operator A to the video Y results in a vector b=A(Y) that only contains the the pixels with intensity values. Then, we determine the low-rank approximation X of Y that corresponds to the background pixels, and a sparse component S corresponding to the moving objects in the scene, such that $\|b - A(X+S)\|_F \leq \sigma$, where $\sigma$ is the predetermined error tolerance or termination condition, and F represent a Frobenius norm.

FRMC in Batch Mode

In batch mode, disjoint groups of n video images are warped and aligned separately into matrices $Y_j$, where j indicates the GOP number. The FRMC method is then applied to each matrix $Y_j$ resulting in the background matrix $X_j$ and the foreground matrix $S_j$. Note that every column of $S_j$ is a vectorization of a single image containing moving objects in the GOP.

FRMC in Real-Time Mode

In real-time mode, we first extract a background estimate according to the decomposition $X_1 = L_1 R_1^T$ using the first n>1 video images. The number n can be selected to satisfy a maximum delay requirement. For every subsequent image indexed by i=n+1, ..., N, we align $L_{i-1}$ with the perspective of image i to produce $\hat{L}_{i-1}$, and match the background $X_{i-1} = L_{i-1} R_{i-1}^T (1, \to)$ to that of the new image. We then perform a single gradient update of equation (3) initialized with $\hat{L}_{i-1}, R_{i-1}(1, \to))$, where $R_{i-1}(1, \to)$ is the first row in the matrix $R_{i-1}$.

In order to speed up the computation of the sparse component, we replace equation (4) in FIG. 2 with a small number of approximate message passing (AMP) iterations $$S^{t+1} = \eta(S^t + A^T z^t, \gamma), \quad (7)$$

$$z^{t+1} = b - AS^{t+1} + \frac{\|S^{t+1}\|_0}{mn} z^t$$

where $z^0 = b$, $S^0 = 0$, $\eta$ is the soft-thresholding operator $$\eta(x, \gamma) = \begin{cases} \text{sign}(x)(|x| - \gamma) & |x| \geq \gamma \\ 0 & \text{otherwise} \end{cases},$$

and $\gamma$ is the an adaptive threshold, which is equal to the mode of the histogram of $S^1$.

EFFECT OF THE INVENTION

The invention provides a method for video background subtraction method based on factorized matrix completion with global motion compensation. The method decomposes a sequence of video images into a sum of a low rank background component and a sparse motion component. The method alternates between the solution of each component following a Pareto curve trajectory for each subproblem. For videos with moving a background, we use motion vectors extracted from the video to compensate for changes in the camera perspective. Performance evaluations show that our approach is faster than state-of-the-art solvers and results in highly accurate motion segmentation for both stationary and non-stationary scenes. In fact, the method can estimate the perspective parameters, align the images, and segment common intermediate format (CIF) resolution videos at a rate that exceeds ten images per second.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for processing a video acquired of a scene, wherein the video includes a sequence of images, comprising the steps of:
   solving for a low rank component of the video;
   solving for a sparse component of the video;
   following a Newton root finding step to traverse separately Pareto curves of each low rank component and sparse component to find successively better approximations to roots of a real-valued function;
   repeating alternately the solving for the low rank component and the sparse component until a termination condition is reached; and
   outputting the low rank component and the sparse component when the termination condition is reached, wherein the low rank component represents a background in the video, and the sparse component represents moving objects in the video, and wherein the steps are performed in a processor.

2. The method of claim 1, wherein a restriction operator selects a subset of the sequence of images to be processed.

3. The method of claim 2, wherein the low rank component is found by minimizing a proxy of a nuclear norm of a matrix based on a low rank factorization.

4. The method of claim 1, wherein the video is acquired of the scene by a moving camera, and further comprising:
   estimating the global motion parameters in the video to compensate for the camera motion.

5. The method of claim 4, wherein the global motion parameters are estimated using encoded motion vectors from a video encoder or in a compressed video bitstream.

6. The method of claim 1, wherein the processing is in real-time as the video is acquired.

7. The method of claim 1, wherein the sparse component is determined using approximate message passing iterations with an adaptive threshold parameter.

\* \* \* \* \*